(12) United States Patent
Huang et al.

(10) Patent No.: US 12,397,454 B2
(45) Date of Patent: Aug. 26, 2025

(54) AIRTIGHT SWITCH AND AIRTIGHT DEVICE

(71) Applicant: WE SOLUTIONS TECHNOLOGY CO., LTD, Taoyuan (TW)

(72) Inventors: Chung-Peng Huang, Taoyuan (TW); Fang-Yi Lin, Taoyuan (TW); Kuan-Lin Chen, Taoyuan (TW); Chun-Ching Kuo, Taoyuan (TW)

(73) Assignee: WE SOLUTIONS TECHNOLOGY CO., LTD, Taoyuan (TW)

( * ) Notice: Subject to any disclaimer, the term of this patent is extended or adjusted under 35 U.S.C. 154(b) by 0 days.

(21) Appl. No.: 18/542,795

(22) Filed: Dec. 18, 2023

(65) Prior Publication Data
US 2025/0006440 A1  Jan. 2, 2025

Related U.S. Application Data

(60) Provisional application No. 63/511,185, filed on Jun. 30, 2023.

(51) Int. Cl.
| | |
|---|---|
| *B25J 21/00* | (2006.01) |
| *B25J 11/00* | (2006.01) |
| *F25B 21/02* | (2006.01) |
| *F25D 21/14* | (2006.01) |

(Continued)

(52) U.S. Cl.
CPC .......... *B25J 21/00* (2013.01); *B25J 11/005* (2013.01); *F25B 21/02* (2013.01); *F25D 21/14* (2013.01); *H01H 1/64* (2013.01); *H01H 15/10* (2013.01); *H01H 2223/002* (2013.01)

(58) Field of Classification Search
CPC ........... H01H 2050/00; H01H 2050/02; H01H 2050/16; H01H 2050/166; H01H 2201/00; H01H 2201/01; H01H 2207/034; H01H 2207/048; H01H 2221/00; H01H 2223/00; H01H 2223/002; H01H 2223/01; H01H 2223/044; H01H 1/36; H01H 1/64; H01H 15/00; H01H 15/02; H01H 15/10; H01H 15/24; H01H 9/02; H01H 9/0207; H01H 2001/36; H01H 2001/40; H01H 2009/02; H01H 2009/04; H01H 2009/048; (Continued)

(56) References Cited

U.S. PATENT DOCUMENTS 2,770,697 A * 11/1956 Kellett ................... H01H 36/00
                                                           200/329
11,160,178 B2 * 10/2021 Wright ..................... H05K 5/06

FOREIGN PATENT DOCUMENTS

SE          0154369 A2 *  2/1985  ............. H01H 71/70

* cited by examiner

Primary Examiner — Anthony R Jimenez

(57) ABSTRACT

An airtight switch adapted for an airtight device comprises an enclosure and a lid structure which are adapted to be joined with each other at a junction plane. The airtight switch includes a slider disposed at one of the enclosure or the lid structure. The airtight switch includes a contact element disposed at the other of the enclosure or the lid structure. The contact element has a sloped surface, and the slider selectively abuts against the sloped surface. The airtight switch includes a linear drive device adapted to drive the slider to move linearly in a sliding direction. The sliding direction is parallel to the junction plane and non-perpendicular to a normal vector of the sloped surface. The airtight switch is adapted to be applied in an airtight device needing a switch with good sealing and airtightness.

8 Claims, 6 Drawing Sheets

(51) Int. Cl.
*H01H 1/64* (2006.01)
*H01H 15/10* (2006.01)

(58) Field of Classification Search
CPC . B25J 21/00; B25J 11/00; F25B 21/02; F25B 21/14
USPC ...................................................... 200/302.1
See application file for complete search history.

AIRTIGHT SWITCH AND AIRTIGHT DEVICE

CROSS-REFERENCE TO RELATED APPLICATION

This non-provisional application claims priority under 35 U.S.C. § 119(e) on U.S. provisional Patent Application No. 63/511,185 filed on Jun. 30, 2023, the entire contents of which are hereby incorporated by reference.

BACKGROUND OF THE INVENTION

1. Field of the Invention

The present disclosure provides an airtight switch, and in particular to an airtight switch adapted for a device or an apparatus needing an airtight and sealed space.

2. Description of the Related Art

In industrial processes or high-performance computing devices, gases with environmental pollution or health hazards frequently need to be used. To prevent related gas leakage or waste, it is necessary for enclosures of related apparatuses or devices be designed with good airtightness.

For example, accompanied with rapid increases in powers and heat flux densities of heating components of electronic elements related to computing in computers, immersion cooling is one of the most effective techniques to quickly reduce the amount of heat generated by electronic computing elements. In two-phase immersion cooling, phase change heat transfer is performed in an enclosed space of a machine, a coolant liquid boils (such as perfluoro-ketone approaching a boiling point of 50° C.) and becomes a coolant gas, the coolant gas is condensed through a condenser tube above, and a liquid after condensation returns to a lower part. Thus, without needing to provide additional resources or pump power for heat dissipation, an effect of coolant circulation is achieved.

However, during maintenance or element replacement of the two-phase immersion cooling device above, a switch of the cooling device needs to be turned on. At this point, the coolant gas can easily diffuse into factory areas, machine rooms or atmosphere, further resulting in environmental pollution or occupational safety hazards to personnel.

BRIEF SUMMARY OF THE INVENTION

In order to provide an apparatus or device that needs to be completely airtight with complete airtightness, for example, a two-phase immersion cooling device that needs to perform phase change heat transfer within an enclosed space, screw locking is conventionally employed to ensure airtightness of a cooling enclosure. Since an airtight apparatus or airtight device requires internal maintenance operations, material intake, and discharge or element replacement, such that a conventional screw locking method is faced with issues of difficulties in opening and closing the airtight apparatus or airtight device and hence maintenance and element replacement complications.

Therefore, there is a need for a solution for providing an airtightness device with a good airtight switch. More particularly, it is important to provide an airtight switch which can be easily opened and closed and has good airtightness, so as to prevent gas leakage and at the same time maintain airtightness of related devices, after element replacement or material intake and discharge is performed.

In view of the above, the present disclosure provides an airtight switch and an airtight device, so as to enable the airtight device to easily open the airtight switch for an element to enter or exit the airtight device, and provide good airtightness after the airtight switch is closed.

An airtight switch adapted for an airtight device is provided according to an embodiment of the present disclosure. The airtight device includes an enclosure and a lid structure, which are adapted to be joined with each other at a junction plane. The airtight switch includes: a slider, disposed at one of the enclosure or the lid structure; a contact element, disposed at the other of the enclosure or the lid structure, the contact element having a sloped surface, wherein the slider selectively abuts against the sloped surface; and a linear drive device, adapted to drive the slider to move linearly in a sliding direction. The sliding direction is parallel to the junction plane, and is non-perpendicular to a normal vector of the sloped surface.

In the airtight switch above, the slider includes a slider sloped surface, which corresponds to the sloped surface of the contact element.

In the airtight switch above, the sliding direction includes a first direction and a second direction which are directions opposite to each other. The linear drive device is adapted to drive the slider to slide in the first direction to approach the contact element, and is adapted to drive the slider to slide in the second direction to move farther away from the contact element.

In the airtight switch above, the contact element is formed to have a slide groove adapted to selectively accommodate the slider. The sloped surface is disposed in the slide groove and is oblique in the first direction, and an included angle between a normal vector of the sloped surface and the first direction is an obtuse angle.

In the airtight switch above, the linear drive device is disposed at one of the enclosure and the lid structure at which the slider is disposed.

The airtight switch above further includes a slide track, which is disposed in parallel to the sliding direction and disposed at one of the enclosure or the lid structure disposed at which the slider is disposed. The slider further includes a protrusion protruding from the slide track.

The airtight switch above further includes a buffer airtight member, which is disposed on at least one of the lid structure and the enclosure.

An airtight device is provided according to an embodiment of the present disclosure. The airtight device includes: an enclosure; a lid structure, wherein the lid structure and the enclosure are adapted to be joined with each other; and an airtight switch, including: a slider, disposed at one of the enclosure and the lid structure; a contact element, disposed at the other of the enclosure and the lid structure, the contact element having a sloped surface, wherein the slider selectively abuts against the sloped surface; and a linear drive device, adapted to drive the slider to move linearly in a sliding direction, wherein the sliding direction is parallel to a junction plane when the enclosure and the lid structure are joined with each other.

The airtight device further includes the airtightness switch described above.

With the airtight switch and the airtight device of the present disclosure, an airtight device, apparatus, or machine in which a lid structure that needs to be opened, can be quickly opened and closed, while good airtight reliability is maintained. Thus, with the airtight switch and the airtight device of the present disclosure, a device that needs to be airtight, for example, a cooling enclosure that needs to perform phase change heat transfer within an enclosed space, can be kept completely airtight. Compared to a conventional method of using a screw for dead locking and sealing or other fixed sealing methods, the airtight switch and the airtight device of the present disclosure, while being kept completely airtight, are provided with flexibilities for opening a lid structure at all times for maintenance, element replacement, or material intake and discharge. Meanwhile, with the design of the slope surface of the contact element and the inner sloped surface of the slide groove, movement is kept smooth when the slider and the slope surface are in contact, further smoothly achieving airtight joining.

DETAILED DESCRIPTION OF THE INVENTION

The technical contents of the present disclosure are to be further described in detail by way of embodiments with the accompanying drawings. It should be noted that, in the present disclosure, terms such as "first", "second" and "third" are used to distinguish differences among elements, and are not to be construed as limiting to the elements themselves and specific orders of the elements. Moreover, in the present disclosure, a specific number is specified, the article "a/an/one" refers to one element or more.

To fully understand the objects, features, and effects of the present disclosure, the present disclosure is described in detail by way specific embodiments with the accompanying drawings.

Figure 1:
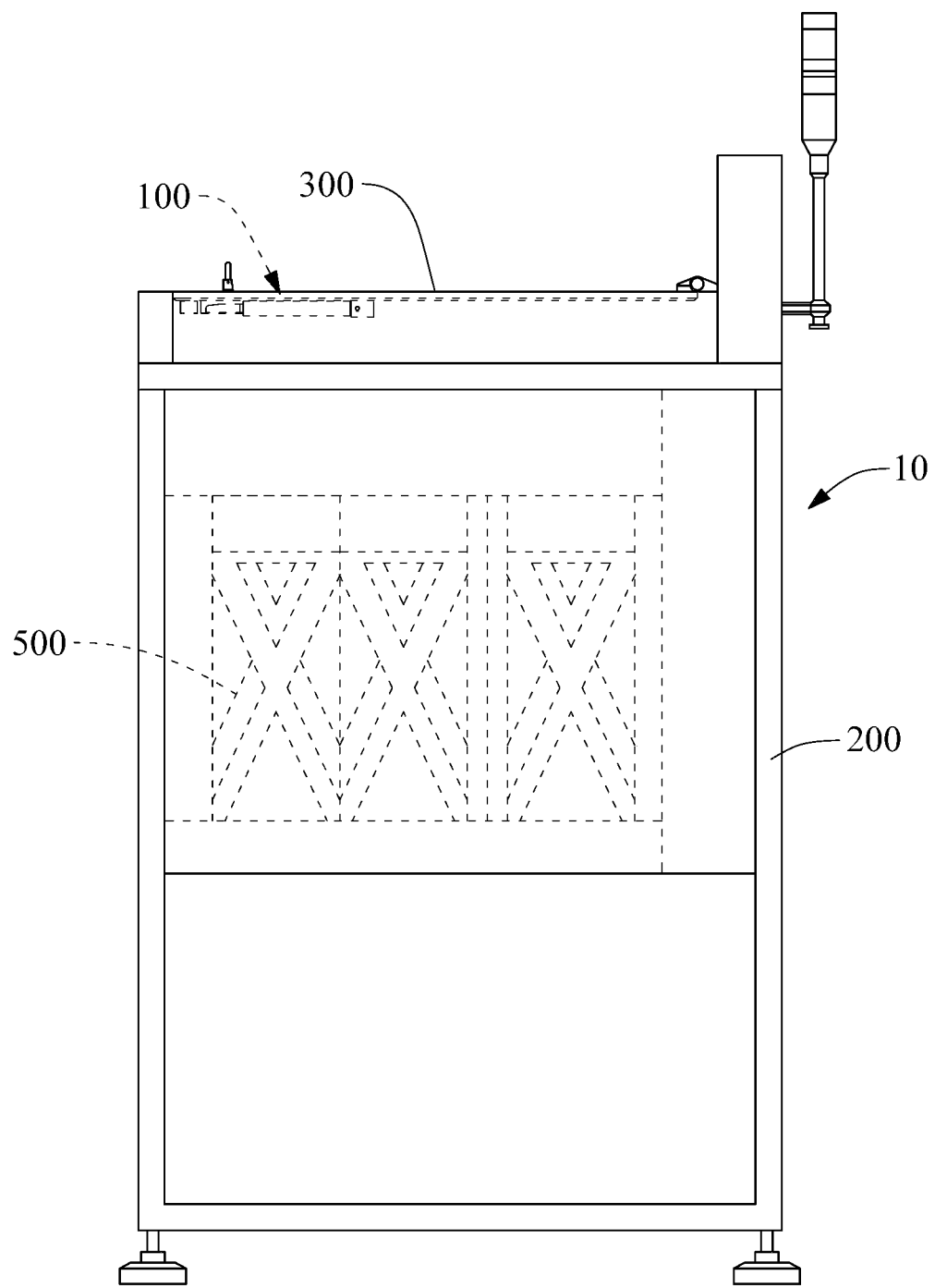
FIG. 1 is a schematic diagram of an airtight device according to an embodiment of the present disclosure.

FIG. 1 shows a schematic diagram of an airtight device according to an embodiment of the present disclosure. The airtight device 10 includes an enclosure 200 and a lid structure 300. The enclosure 200 and the lid structure 300 are adapted to be joined with each other to form an airtight accommodation space, which is adapted to carry, store, and accommodate an containment component 500. In an embodiment of the present disclosure, the enclosure 200 is, for example, a cooling enclosure, and is adapted to store an electronic device needing cooling and heat dissipation. The containment component 500 is, for example, a highly heat generating electronic computing device with a high heat flux density, such as a computing server. The enclosure 200 has an opening adapted for the containment component 500 to enter and exit the enclosure 200. The lid structure 300 is disposed at the opening of the enclosure 200 and is adapted to form an airtight accommodation space with the enclosure 200. When the enclosure 200 and the lid structure 300 are joined with each other, a junction plane P is formed, wherein the junction plane P is used to represent a junction plane when the enclosure 200 and the lid structure 300 are joined with each other to form airtightness.

Figure 2A:
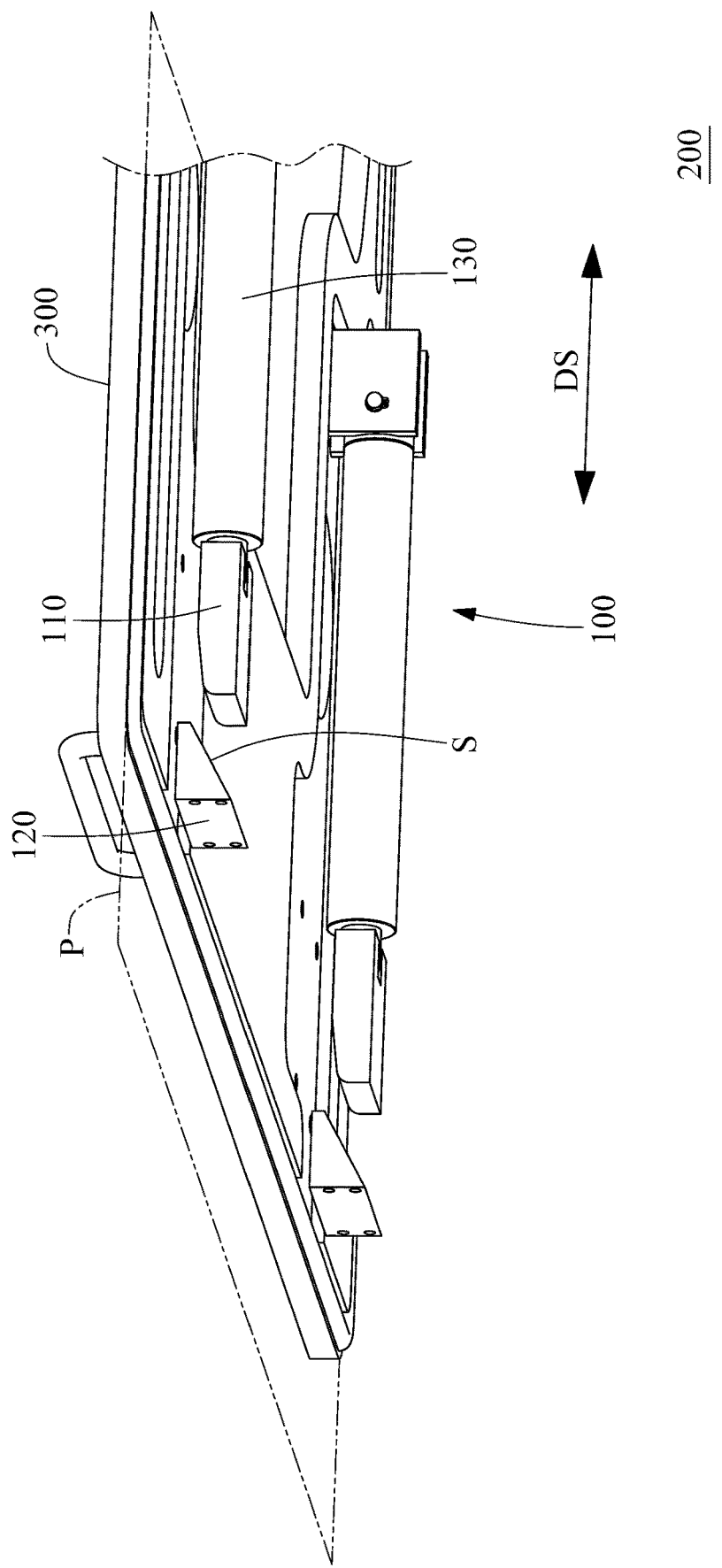
FIG. 2A is a perspective diagram of an airtight switch according to an embodiment of the present disclosure.

FIG. 2A shows a perspective diagram of an airtight switch according to an embodiment of the present disclosure. The airtight switch 100 is adapted for the airtight device 10, and adapted for, for example but not limited to, a device needing an airtight function and at the same time a switch opening. The airtight switch 100 includes a slider 110, a contact element 120 and a linear drive device 130. The slider 110 is disposed at one of the enclosure (not shown) or the lid structure 300. The contact element 120 is disposed at the other of the enclosure (not shown) or the lid structure 300. That is, the slider 110 and the contact element 120 are arranged at a position of different components, and are configured to mutually correspond in space and align with each other. It should be noted that, the expression that the slider 110 or the contact element 120 are disposed at corresponding positions at one or the other of the enclosure and the lid structure 300 refers to that, they move relative to the components at which they are disposed. For example, when the slider 110 is disposed at the lid structure 330 and the lid structure 300 opens and moves upward, the slider 110 also moves upward. That is, a change in the relative positions of the slider 110 and the contact element 120 also causes a change in the relative positions of the enclosure and the lid structure 300. In an embodiment of the present disclosure, the slider 110 and the contact element 120 are not limited to being disposed at the enclosure or the lid structure, but can be disposed at any junction in any form of combination so as to form an airtight function. In an embodiment of the present disclosure, as shown in FIG. 2A, the linear drive device 130 and the slider 110 are disposed at the lid structure 300, and the contact element 120 is disposed at the enclosure (not shown). For example, the contact element 120 can be disposed at a position inside the enclosure (not shown) and close to the lid structure 300. The enclosure is omitted from the drawing so as to clearly depict the structure of the airtight switch 100. In an embodiment of the present disclosure, the linear drive device 130 is directly disposed on the lid structure 300, and the slider 110 is disposed on the linear drive device 130 and is driven by the linear drive device 130. The contact element 120 has a sloped surface S that is oblique to a sliding direction DS, and the slider 110 selectively abuts against the sloped surface S. The sliding direction DS is non-perpendicular to a normal vector of the sloped surface S. In an embodiment of the present disclosure, the sloped surface S of the contact element 120 can also be a contact surface such as an arc surface or a curved surface that is non-parallel to the sliding direction DS, wherein a secant line of the arc surface or the curved surface is non-parallel to the sliding direction DS. The linear drive device 130 is adapted to drive the slider 110 to move linearly in the sliding direction DS, wherein the sliding direction DS is parallel to the junction plane P when the enclosure (not shown) and the lid structure 300 are joined with each other. In an embodiment of the present disclosure, the linear drive device is, for example but not limited to, a linear displacement drive device such as an electric cylinder, an electromagnet, a motor, and a step motor. When the linear drive device 130 drives the slider 110 to slide in the sliding direction DS, a front end of the slider 110 selectively abuts against the contact element 120. When the slider 110 abuts against the contact element 120 and the linear drive device 130 continues pushing the slider 110 to further abut against the contact element 120, the front end of the slider 110 comes into contact with the sloped surface S and receives a forward force provided by the sloped surface S, such that the slider 110 moves in a normal direction of the sloped surface S different from the sliding direction DS. Thus, one of the enclosure (not shown) or the lid structure 300 linked with the slider 110 receives a force and moves in the normal direction of the sloped surface S, so that the enclosure (not shown) and the lid structure 300 are further joined and tightly connected, hence enhancing the airtightness at the junction.

In an embodiment of the present disclosure, the slider 110 includes a slider sloped surface, which corresponds to the sloped surface S of the contact element 120. Thus, when the slider 110 is caused to selectively abut against the sloped surface S of the contact element 120, a push contact area thereof is increased to reduce a pressure at a contact point during the pushing, and better smoothness and stability can be provided when the slider 110 abuts against the sloped surface S of the contact element 120.

Figure 2B:
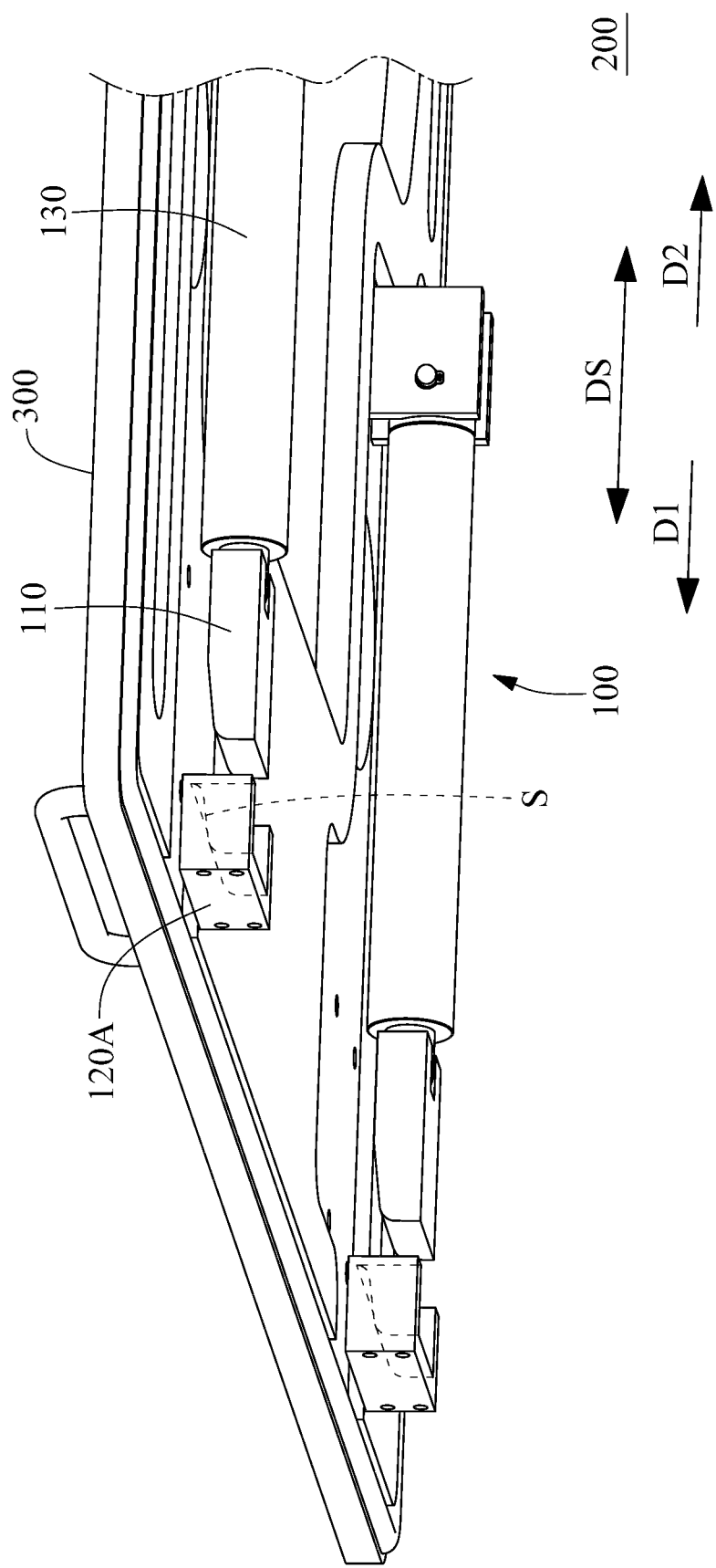
FIG. 2B is a perspective diagram of an airtight switch according to an embodiment of the present disclosure.

FIG. 2B shows a perspective diagram of an airtight switch according to an embodiment of the present disclosure. In an embodiment of the present disclosure, the contact element 120 is formed as a slide groove 120A. The slide groove 120A has an opening formed to face the slider so as to be adapted to selectively accommodate the slider 110. The slide groove 120A is provided with the sloped surface S oblique to the sliding direction DS, wherein the sliding direction DS includes a first direction D1 and a second direction D2 which are directions opposite to each other. The linear driving device 130 is adapted to drive the slider 110 to slide in the first direction D1 to approach the slide groove 120A, and is adapted to drive the slider 110 to slide in the second direction D2 to move farther away from the slide groove 120A. Thus, with the arrangement of the slide groove 120A, the slider 110, when abutting against the sloped surface S of the slide groove 120A, can be accommodated by the slide groove 120A and be stabilized and secured, and can also be prevented from sliding or moving horizontally in a direction other than the sliding direction SD. Thus, the slider 110 receives only the forward force of the sloped surface S, providing an effect of even better airtightness when the enclosure (not shown) and the lid structure 300 are joined with each other.

Figure 3A:
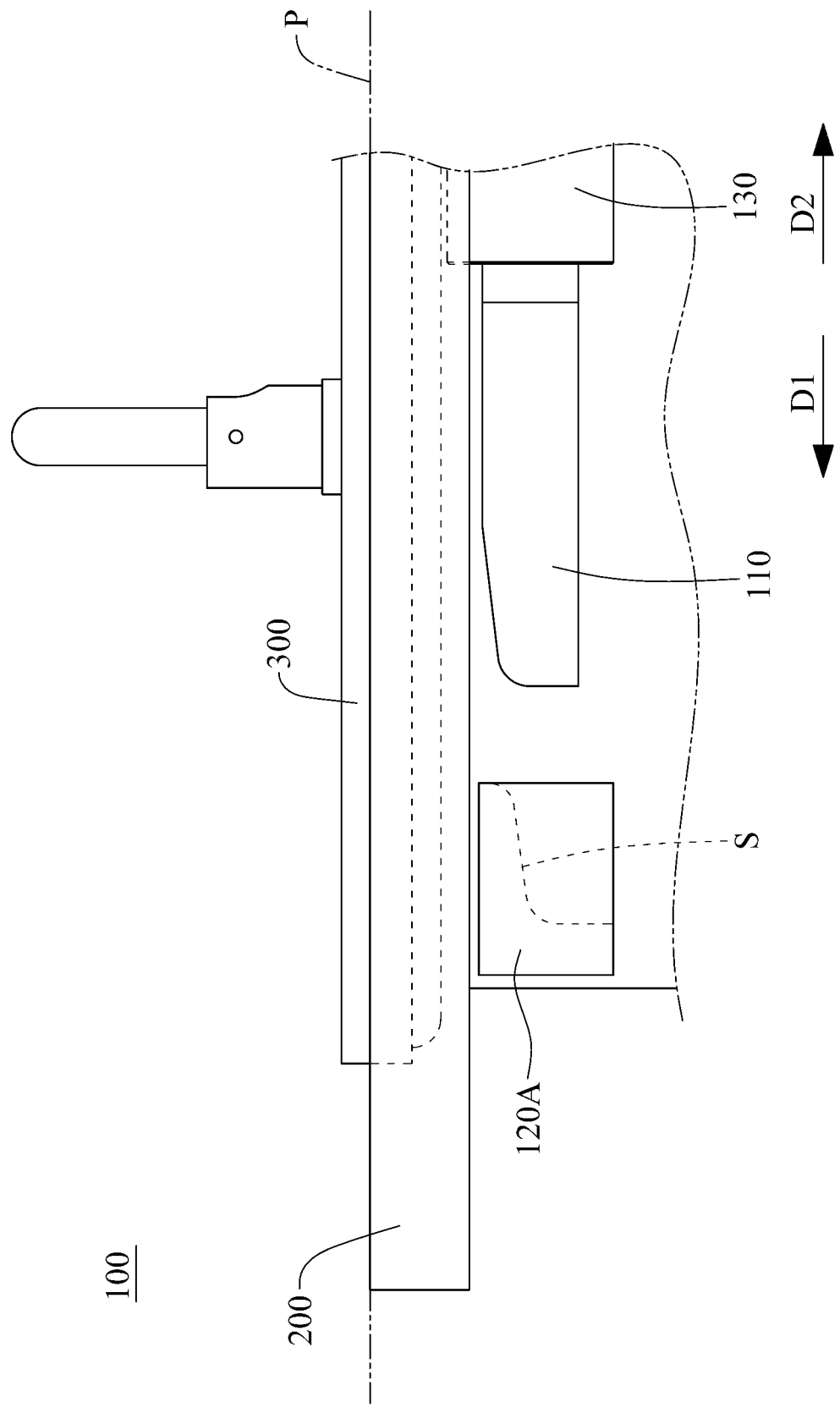
FIG. 3A is a schematic diagram of operation of an airtight switch according to an embodiment of the present disclosure.
Figure 3B:
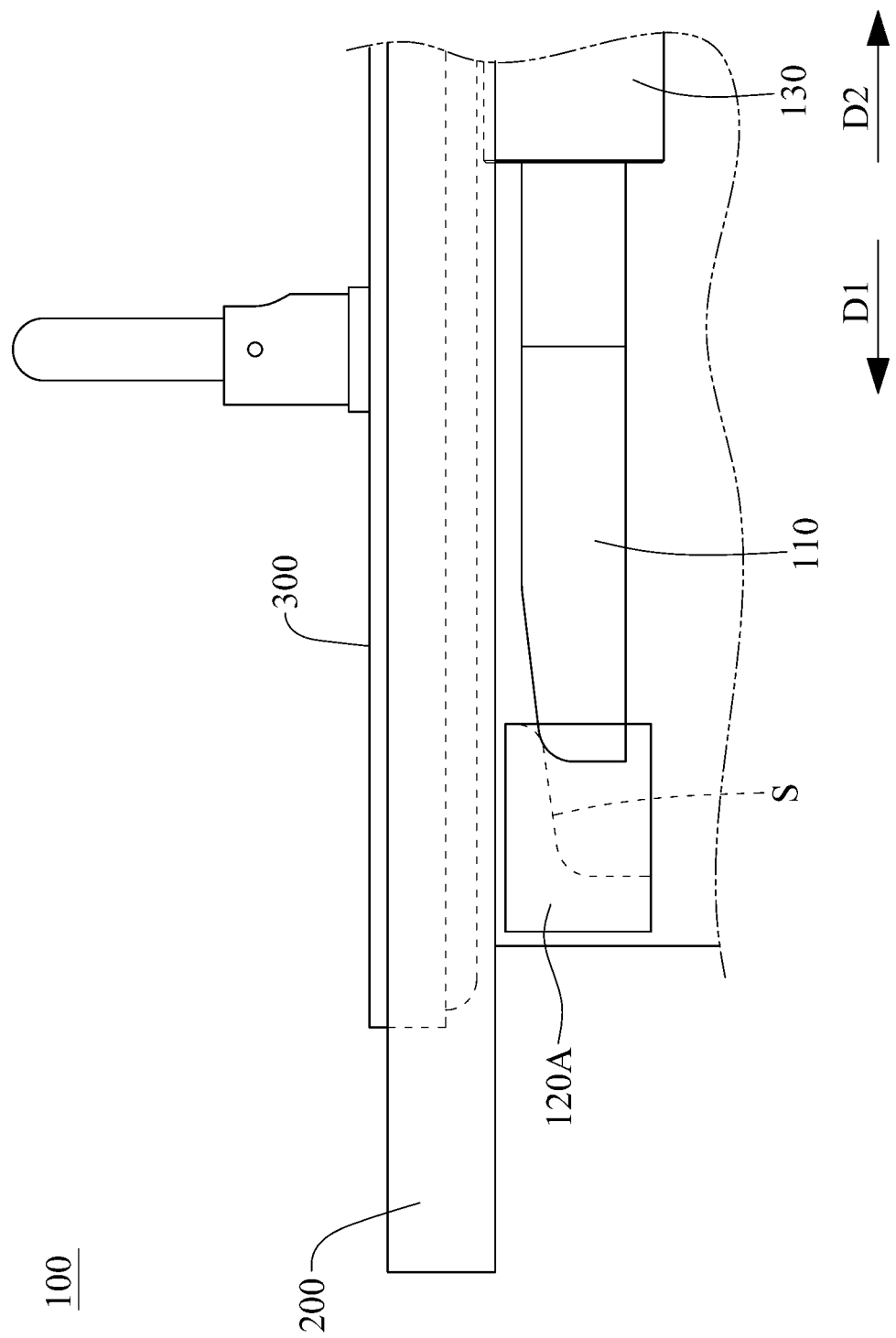
FIG. 3B is a schematic diagram of operation of an airtight switch according to an embodiment of the present disclosure.
Figure 3C:
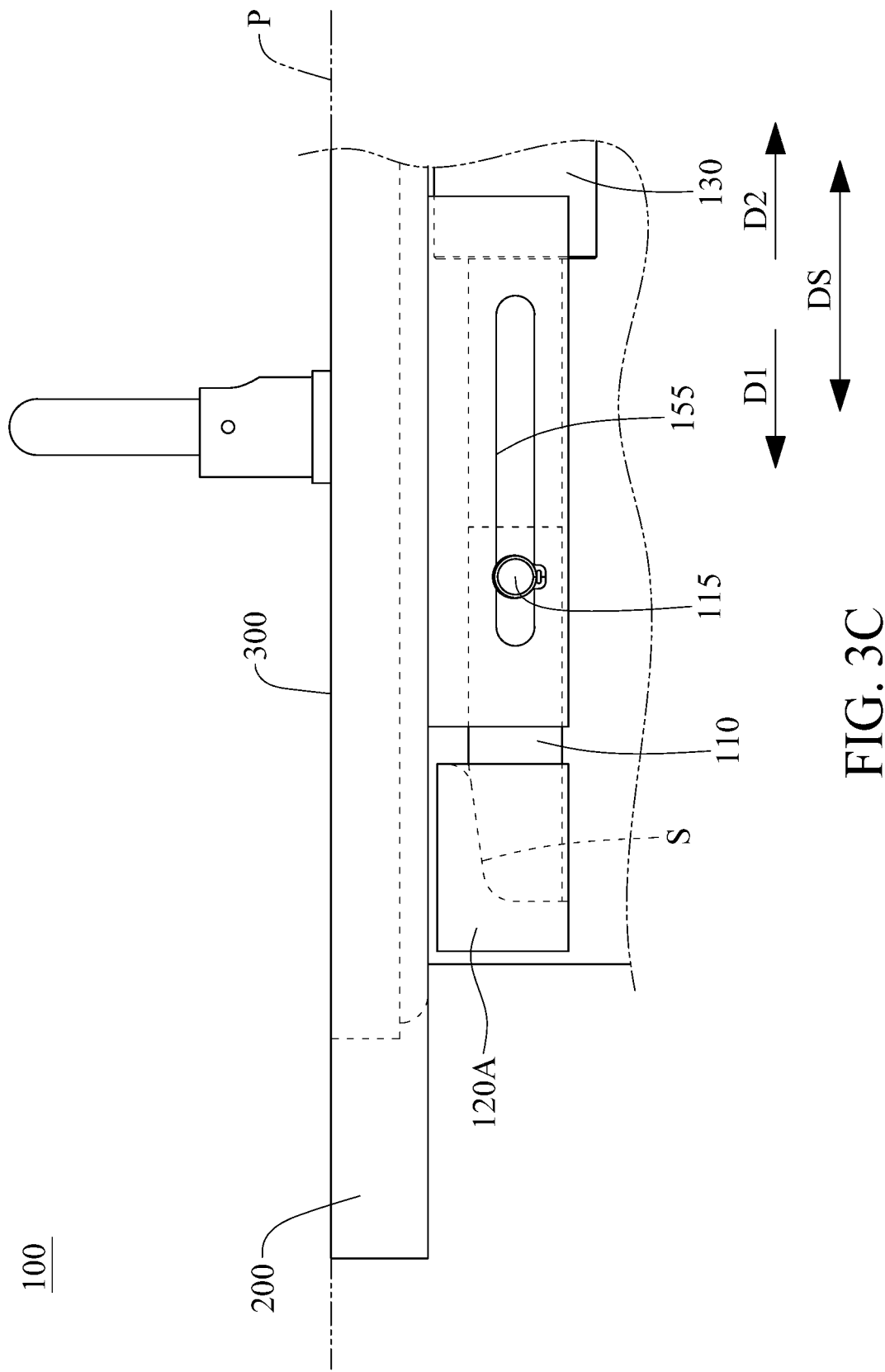
FIG. 3C is a schematic diagram of operation of an airtight switch according to an embodiment of the present disclosure.

FIG. 3A to FIG. 3C show schematic diagrams of operation of an airtight switch according to an embodiment of the present disclosure. Referring to FIG. 3A to FIG. 3C, operation details of the airtight switch 100 are further given below. The linear drive device 130 drives the slider to move in the first direction D1 to approach the slide groove 120A (for example, as shown in FIG. 3A to FIG. 3C, the slider moves from right to left to approach the slide groove 120A), or drives the slider to move in the second direction D2 opposite to the first direction D1 to move farther away from the slide groove 120A. The first direction D1 is parallel to the junction plane P between the lid structure 300 and the enclosure 200. In an embodiment of the present disclosure, for example, as shown in FIG. 3A to FIG. 3C, the linear drive device 130 drives the slider 110 to move to the left of the drawing so as to approach the slide groove 120A. One end of the slide groove 120A close to the slider 110 is formed to have an opening to accommodate the slider 110. As shown in FIG. 3A, the slide groove 120A is formed to have the sloped surface S non-parallel to the first direction D1, that is, the sloped surface S is disposed in the slide groove 120A, and an included angle between a normal vector of the sloped surface S and the first direction D1 is an obtuse angle. As shown in FIG. 3A, the slide groove 120A has the sloped surface S that is downwardly oblique in a direction on the left, that is, an included angle between a direction pointed by the first direction D1 and the normal vector of the sloped surface S is an obtuse angle (an angle greater than 90 degrees). Moreover, a front end of the slider 110 has a sloped surface (that is, the slider sloped surface) corresponding to the sloped surface S of the slide groove 120A.

Referring to FIG. 3B, once the slider 110 enters the slide groove 120A, the linear drive device 130 further drives the slider 110 to move in the first direction D1, such that the slider 110 comes into contact with the sloped surface S of the slide groove 120A. With the continuous push force of the linear drive device 130, the slider 110 abuts against the sloped surface S and receives a forward force of the sloped surface S, and moves in a direction of the normal vector of the sloped surface S (for example, as shown in FIG. 3B, due to the oblique direction of the sloped surface S, the pushed slider 110 receives a force of a downward pressure, such that the lid structure 300 linked with the slider 110 receives a force and moves downward), further causing the lid structure 300 and the enclosure 200 to further come into contact and gradually become sealed and airtight. As a contact area between the slider 110 and the sloped surface S of the slide groove 120A increases, as shown in FIG. 3C, the force (for example, a downward force) received by the slider 110 along the sloped surface S gets larger, such that the lid structure 300 receives an even greater force (for example, a downward force) to press against the enclosure 200, thereby ensuring the airtightness at the junction between the lid structure 300 and the enclosure 200.

In an embodiment of the present disclosure, referring to FIG. 3C, the airtight switch 100 further includes a slide track 155. The slide track 155 is disposed in parallel to the sliding direction DS and is disposed at one of the enclosure 200 or the lid structure 300 at which the slider 110 is disposed. The slider 110 further includes a protrusion 115, which is slidably disposed in the slide track 155. Thus, when the protrusion 115 of the slider 110 slides in the slide track 155, it is ensured that the slider 110 driven by the linear drive device 130 moves in parallel in the sliding direction DS, and that the slider 110 is kept parallel to the junction plane P, so that the airtight junction between the lid structure 300 and the enclosure 200 is kept uniform and tight.

In an embodiment of the present disclosure, the lid structure 300 is located above the enclosure 200. When the linear drive device 130 further pushes the slider 110 to move in the direction of the slide groove 120A and the slider 110 to come into contact with the sloped surface S, a force is further generated to cause the lid structure 300 to press the enclosure 200 downward so as to ensure the airtightness. It should be noted that, the lid structure 300 is not limited to being disposed above the enclosure 200, but can be disposed in various directions relative to the enclosure 200.

In an embodiment of the present disclosure, the linear drive device 130 is disposed at one of the enclosure 200 or the lid structure 300 at which the slider 110 is disposed; however, the linear drive device 130 is not limited to being disposed on the same component as the slider 110, but can be disposed at a different component, provided that it achieves the function of drive the slider 110 to move linearly along the sliding direction DS.

In an embodiment of the present disclosure, a driving distance by which the linear drive device 130 controls and pushes the slider is programmable, so as to control the level of pressure and the level of airtightness by means of controlling the push force. In an embodiment of the present disclosure, the linear drive device 130 can be programmably controlled and/or remotely controlled.

In an embodiment of the present disclosure, the airtight switch 100 further includes a buffer airtight member. The buffer airtight member is disposed on at least one of the lid structure 300 or the enclosure 200, and can be disposed on an edge of a junction of at least one of the lid structure 300 or the enclosure 200, so as to increase buffering elasticity and airtightness between components when the lid structure 300 and the enclosure 200 are pressed and joined with each other. In an embodiment of the present disclosure, the buffer airtight member is shaped as an O ring. In an embodiment of the present disclosure, the buffer airtight member is formed of an elastic material.

In an embodiment of the present disclosure, the airtight switch 100 further includes a control device, which is adapted to control the linear drive device 130. In an embodiment of the present disclosure, the airtight switch 100 further includes a wireless communication module, which is adapted to receive external signals so as to control the linear drive device 130.

In an embodiment of the present disclosure, the airtight switch 100 can be multiple in number. In an embodiment of the present disclosure, the airtight switch 100 is disposed on two sides of the lid structure 300 to provide the lid structure 300 with a uniform force of pressure, such that the lid structure 300 receives a uniform force so as to be joined with and forming airtightness with the enclosure 200.

With the airtight switch and the airtight device of the present disclosure, an airtight device, apparatus, or machine in which a lid structure needs to be opened, can be quickly opened and closed, while good airtight reliability is maintained. Thus, with the airtight switch and the airtight device of the present disclosure, a device that needs to be airtight, for example, a cooling enclosure that needs to perform phase change heat transfer within an enclosed space, can be kept completely airtight. Compared to a conventional method of using a screw for dead locking and sealing or other fixed sealing methods, the airtight switch and the airtight device of the present disclosure, while being kept completely airtight, are provided with flexibilities for opening a lid structure at all times for maintenance, element replacement, or material intake and discharge. Meanwhile, with the design of the slope surface of the contact element and the inner sloped surface of the slide groove, movement is kept smooth when the slider and the slope surface are in contact, further smoothly achieving airtight joining.

The present invention is described by way of the preferred embodiments above. A person skilled in the art should understand that, these embodiments are merely for describing the present invention are not to be construed as limitations to the scope of the present invention. It should be noted that all equivalent changes, replacements and substitutions made to the embodiments are to be encompassed within the scope of the present invention. Therefore, the protection of the present invention should be accorded with the broadest interpretation of the appended claims, so as to encompass all modifications and similar arrangements and processes.

What is claimed is:

1. An airtight switch, adapted for an airtight device, the airtight device comprising an enclosure and a lid structure which are adapted to be joined with each other at a junction plane; the airtight switch comprising:
   a slider, disposed at one of the enclosure or the lid structure;
   a contact element, disposed at the other of the enclosure or the lid structure, the contact element having a sloped surface, wherein the slider selectively abuts against the sloped surface; and
   a linear drive device, adapted to drive the slider to move linearly in a sliding direction, wherein the sliding direction is parallel to the junction plane and is non-perpendicular to a normal vector of the sloped surface, and
   wherein the enclosure and the lid structure are joined and connected to form airtightness when the slider abuts against the contact element.

2. The airtight switch according to claim 1, wherein the slider comprises a slider sloped surface, which corresponds to the sloped surface of the contact element.

3. The airtight switch according to claim 1, wherein the linear drive device is disposed at one of the enclosure or the lid structure at which the slider is disposed.

4. The airtight switch according to claim 1, further comprising:
   a slide track, disposed in parallel to the sliding direction and disposed at one of the enclosure or the lid structure disposed at which the slider is disposed, the slider further comprising a protrusion protruding from the slide track.

5. The airtight switch according to claim 1, further comprising:
   a buffer airtight member, disposed on at least one of the lid structure or the enclosure.

6. The airtight switch according to claim 1, wherein the sliding direction includes a first direction and a second direction which are directions opposite to each other; the linear drive device is adapted to drive the slider to slide in the first direction to approach the contact element, and is adapted to drive the slider to slide in the second direction to move farther away from the contact element.

7. The airtight switch according to claim 6, wherein the contact element is formed to have a slide groove adapted to selectively accommodate the slider, the sloped surface is disposed in the slide groove and is oblique in the first direction, and an included angle between a normal vector of the sloped surface and the first direction is an obtuse angle.

8. An airtight device, comprising:
   an enclosure;
   a lid structure, adapted to be joined with the enclosure; and
   an airtight switch, disposed at the enclosure and the lid structure, comprising:
      a sliding block, disposed at one of the enclosure or the lid structure;
      a contact element, disposed at the other of the enclosure or the lid structure, the contact element having a sloped surface, wherein the slider selectively abuts against the sloped surface; and
      a linear drive device, adapted to drive the slider to move linearly in a sliding direction, wherein the sliding direction is parallel to a junction plane when the enclosure and the lid structure are joined with each other, and
      wherein the enclosure and the lid structure are joined and connected to form airtightness when the slider abuts against the contact element.

* * * * *